United States Patent [19]
Hayashi

[11] Patent Number: 5,650,674
[45] Date of Patent: Jul. 22, 1997

[54] ENCLOSED ELECTRIC MOTOR WITH DYNAMIC PRESSURE AIR BEARING

[75] Inventor: Kunio Hayashi, Konan, Japan

[73] Assignee: Kabushiki Kaisha Toshiba, Japan

[21] Appl. No.: 504,329

[22] Filed: Jul. 19, 1995

[30] Foreign Application Priority Data

Jul. 19, 1994 [JP] Japan .................................. 6-166818

[51] Int. Cl.$^6$ .............................. H02K 7/08; H02K 15/14
[52] U.S. Cl. ................................ 310/51; 310/56; 310/89; 310/90; 310/90.5
[58] Field of Search ..................................... 359/196, 200, 359/212, 217, 223; 356/223, 226, 508, 511, 513, 877; 310/51, 90, 90.5, 89, 56

[56] References Cited

U.S. PATENT DOCUMENTS

| | | | |
|---|---|---|---|
| 2,488,387 | 3/1949 | Elsay | 310/56 |
| 4,644,202 | 2/1987 | Kroy et al. | 310/58 |
| 5,434,695 | 7/1995 | Saito et al. | 359/200 |
| 5,438,447 | 8/1995 | Kunii | 359/300 |

FOREIGN PATENT DOCUMENTS

| | | | |
|---|---|---|---|
| 49345 | 3/1982 | Japan | 310/51 |
| 4109838 | 4/1992 | Japan | 310/51 |
| 584159 | 11/1993 | Japan . | |

Primary Examiner—Thomas M. Dougherty
Assistant Examiner—Karl I. Tamai
Attorney, Agent, or Firm—Cushman Darby & Cushman Intellectual Property Group of Pillsbury Madison & Sutro, LLP

[57] ABSTRACT

An enclosed electric motor includes a stator assembly, a rotor assembly held via a dynamic pressure air bearing on the stator assembly, and a motor casing enclosing the stator and rotor assemblies. An air flow path is formed in the motor casing so as to communicate between an axial upper space and an axial lower space in the motor casing, so that the difference in air pressure between these spaces is reduced. Heat-dissipating fins are formed on the outer periphery of the motor casing so as to correspond to the air flow path. When the motor casing is formed with a plurality of air flow paths, a circumferential interval of the air flow paths is set at 150 degrees. A circumferential interval of two concavities formed in the inner periphery of the motor casing is also set at 150 degrees. Either one of the concavities serves as a window through which laser beams pass when the motor is used as a scanner motor for driving a polygon mirror which is employed for scanning laser beams in a laser printer.

6 Claims, 7 Drawing Sheets

ENCLOSED ELECTRIC MOTOR WITH DYNAMIC PRESSURE AIR BEARING

BACKGROUND OF THE INVENTION

1. Field of the Invention

This invention relates to an enclosed electric motor wherein a rotor assembly is provided in a motor casing together with dynamic pressure air bearing means.

2. Description of the Prior Art

Enclosed electric motors are provided with dynamic pressure air bearing means in which air is used as a lubricating fluid. These enclosed motors are used as scanner motors for driving polygon mirrors which are employed for scanning laser beams in laser beam printers. FIG. 7 illustrates such a conventional enclosed electric motor used for driving the polygon mirror. A base 1 of the motor has a plurality of stepped portions on the upper face thereof and a cylindrical portion 2 formed in the central bottom thereof. A bearing cylinder 3 is inserted in the cylindrical portion 2 to be fixed in position by an adhesive agent. A bottom lid 4 is screwed to the bottom of the cylindrical portion 2. A cover 5 is screwed to the upper side of the base 1 so as to cover the bearing cylinder 3. The base 1 and the cover 5 constitute an enclosed motor casing 6. An electric circuit board 7 is screwed to an upper portion of the base 1 in the motor casing 6. A plurality of stator coils 8 are fixed to the upper face of the circuit board 7 by an adhesive agent.

A rotor assembly 10 including a rotational shaft 9 is provided in the motor casing 6. The rotational shaft 9 is rotatably inserted in the bearing cylinder 3 to be held in position. The rotational shaft 9 and the bearing cylinder 3 constitute dynamic pressure air bearing means. Two pairs of herringbone grooves 11, which compose part of dynamic pressure air bearing means, are formed in the outer circumferential face of the rotational shaft 9.

A flange 12 is fixed to the upper portion of the rotational shaft 9. A rotor yoke 13 is fixed to the flange 12 by an adhesive agent. An annular rotor magnet 14 is fixed to the underside of the rotor yoke 13 by an adhesive agent. The rotor magnet 14 is disposed to be opposite to the stator coils 8 with a predetermined axial gap therebetween. A polygon mirror 15 is mounted to the flange 12. The cover 5 has a window 5a which is disposed so as to correspond to the outer periphery of the polygon mirror 15. Laser beams are allowed to go into and out of the motor casing 6 through the window 5a.

A mounting member 16 is mounted to the back of the flange 12 so as to be rotated with the rotational shaft 9. The mounting member 16 extends through the circuit board 7 so as to cover the bearing cylinder 3 from above the same. A magnetically focusing rotating yoke 17 is fixed to the lower portion of the mounting member 16 so as to be positioned under the circuit board 7. The rotating yoke 17 is disposed to be opposite to the rotor magnet 14 with the circuit board 7 and the stator coils 8 being interposed therebetween so that magnetic fluxes generated by the rotor magnet 14 pass through the rotating yoke 17. A sliding thrust receiving member 18 comprising a sliding bearing is provided on the inside of the bottom lid 4. A thrust load of the rotor assembly 10 is received by the sliding thrust receiving member 18.

Upon rotation of the rotor assembly 10, the herringbone grooves 11 draw air into a bearing gap of several μm defined between the inner circumferential face of the bearing cylinder 3 and the outer circumferential face of the rotational shaft 9, whereupon high dynamic pressure serving as dynamic pressure air bearing is produced. The rotational shaft 9 is rotated without contact with the bearing cylinder 3 by the action of the established dynamic pressure air bearing. Electric motors employing the dynamic pressure air bearing as described above are suitable for high speed rotation.

The enclosed motors with the above-described dynamic pressure air bearing have the following problem. The motors of the type as described above are used in a high speed range (30,000 rpm or above, for example) in many cases. An outer configuration of the rotor assembly 10 or an inner configuration of the cover 5 of the motor casing 6 causes differences in the pressure in a space inside the cover 5. More specifically, air is forced toward the outer periphery of the rotor assembly 10 upon rotation of the same. The air then strikes against the inner inclined face 5b of the cover 5, flowing downwardly. The rotor magnet 14 of the rotor assembly 10 is disposed in the lower space inside the cover 5 and has a large radius of rotation. Accordingly, a gap between the cover 5 and the rotor assembly 10 is relatively small in the lower space inside the cover 5, in which space the rotor magnet 14 is disposed. On the other hand, a gap between the cover 5 and the rotor assembly 10 is larger in the upper space inside the cover 5, in which space the upper end of the rotor assembly 10 is located. A pumping action with rotation of the rotor assembly 10 causes air in the upper space inside the cover 5 to flow downwardly to the lower space inside the cover 5, whereupon the pressure is increased in the lower space while the upper space approaches a vacuum state. Consequently, the rotor assembly 10 is irregularly moved, for example, it is drawn upwardly. In the motor employing the dynamic pressure air bearing, particularly, such irregular movement of the rotor assembly 10 prevents the smooth rotation of the shaft 9 by the dynamic pressure air bearing.

Furthermore, the air high-pressurized in the bearing gap between the bearing cylinder 3 and the rotational shaft 9 generates heat, which increases the temperature in the bearing section. Since the shaft 9 is made of a stainless steel while the bearing cylinder 3 is made from ceramic, for example, the difference in the material between these members results in a difference in a coefficient of thermal expansion between them. The difference in the thermal expansion coefficient between the members causes the bearing gap 19 to vary with an increase in the temperature. This also prevents the normal rotation of the shaft 9 by the dynamic pressure air bearing.

Additionally, noise is produced in the space where the rotor assembly 10 is close to the polygon mirror 15, particularly, in the vicinity of the window 5a. The noise is due to rotation of the polygon mirror through the air.

SUMMARY OF THE INVENTION

Therefore, an object of the present invention is to provide an enclosed electric motor wherein occurrence of the difference in the pressure in the motor casing can be restrained so that the rotor can be rotated smoothly.

Another object of the invention is to provide an enclosed electric motor wherein an increase in the temperature in the motor casing can be prevented so that the smooth rotation of the rotor can be maintained.

Further another object of the invention is to provide an enclosed electric motor wherein the noise can be reduced in the motor casing.

Further another object of the invention is to provide an enclosed electric motor wherein a high-precision and highperformance scanning by the polygon mirror can be maintained for a long period of time.

To achieve these objects, the present invention provides an enclosed electric motor comprising an enclosed motor casing having a window through which laser beams are allowed to go into and out of the motor casing, a rotor assembly including a rotational shaft with an end and a rotor magnet, the rotor assembly being rotatably held via dynamic pressure gas bearing means in the motor casing, a pair of gas flow paths each defined in a portion of a wall of the motor casing opposed to an outer periphery of the rotor assembly so as to extend along the outer periphery of the rotor assembly axially of the rotational shaft, each gas flow path having two ends respectively serving as an inlet and an outlet axially spaced apart from each other and open to the interior of the motor casing so that a gas in the motor casing is caused to flow through the gas flow paths upon rotation of the rotor assembly, and a polygon mirror mounted on the end of the rotational shaft so as to be rotated therewith for reflecting the laser beams having passed through the window of the motor casing. An angle of circumference between the ends of the respective paired gas flow paths is set at a value obtained by the following expression:

$$(360°\div N)\times I+(360°\div N)\times\tfrac{1}{2}$$

where N is the number of mirror surfaces of the polygon mirror and I is an integer.

According to the above-described motor, the gas in the motor casing is caused to flow through the gas flow paths provided in the motor casing, upon rotation of the rotor assembly. Consequently, occurrence of differences in the pressure can be prevented in the motor casing. Thus, even though the dynamic pressure gas bearing means is provided as the bearing means for the rotor assembly, irregular movement of the rotor assembly can be prevented and accordingly, stable rotation of the rotor assembly can be achieved.

Furthermore, noise is produced at the open end of one of the paired gas flow paths one-half-cycle out of phase with noise produced at the open end of the other gas flow path under the condition of the same frequency. Since these noises interfere with each other, a noise reduction can be achieved.

For prevention of turbulence of the gas in the vicinity of the outlet ends of the gas flow path, an annular partition wall may be provided at the outlet end side of the gas flow path so as to be disposed between the inner face of the motor casing and the rotor assembly, the partition wall guiding the gas exiting the outlet end of the gas flow path toward the side of the end of the rotational shaft.

For prevention of the temperature increase in the motor casing, the motor casing may have heat-dissipating fins which are provided on the outer periphery of the motor casing so as to be opposite to the gas flow path. Alternatively, the motor may further comprise a cooling tank disposed outside the motor casing, a cooling device for cooling tank, and a gas flow path member forming member connecting between the inlet and outlet ends of the gas flow path and the cooling tank so that a gas in the motor casing is circulated to the cooling tank.

Even-numbered gas flow paths may be provided in the motor casing. In this arrangement, the gas flow paths preferably have respective ends located on one and the same circumference of a circle described about the center of rotation of the rotor assembly.

Furthermore, for the purpose of the noise reduction, the motor casing may have a window through which laser beams go into and out of the motor casing and a window-shaped portion having substantially the same configuration as the window. In this regard, the window and the window-shaped portion are preferably located on one and the same circumference of a circle described about the center of rotation of the rotor assembly, and an angle of circumference between the window and the window-shaped portion is preferably set at a value obtained by the following expression:

$$(360°\div N)\times I+(360°\div N)\times\tfrac{1}{2}$$

where N is the number of mirror surfaces of the polygon mirror and I is an integer.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
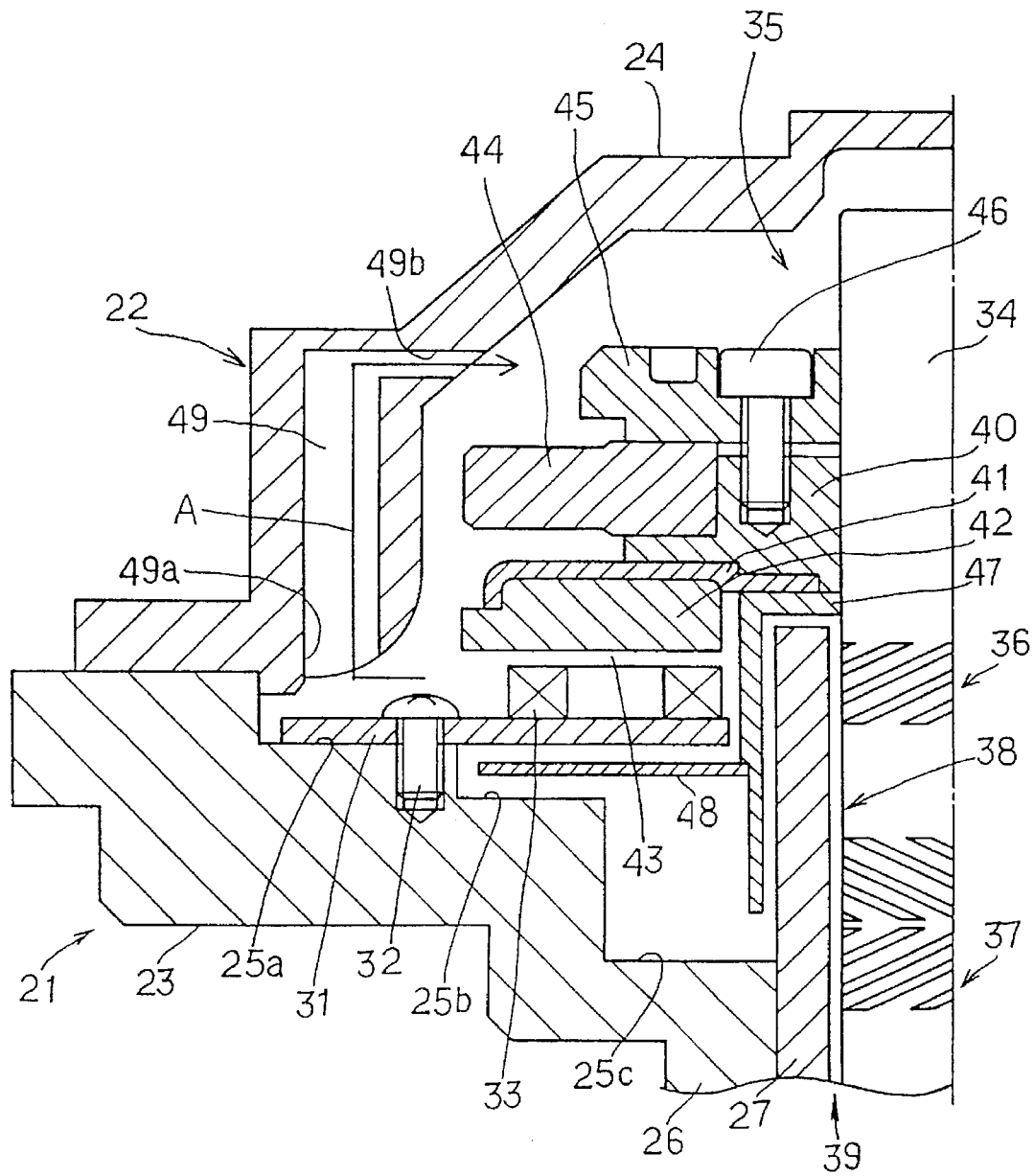
FIG. 1 is a partial enlarged longitudinal section of an enclosed electric motor of a first embodiment in accordance with the present invention.

A first embodiment of the present invention will be described with reference to FIGS. 1 and 2. The enclosed electric motor of the invention is applied to a scanner motor for driving a polygon mirror which is employed in a laser beam printer for scanning laser beams. Referring first to FIG. 2, an overall constitution of the motor is shown. A motor casing 22 composing a stator assembly 21 comprises a base 23 and a cover 24 fixed by screws (not shown) to the upper portion of the base 23, so that the enclosed motor casing 22 is provided.

The base 23 has three stepped portions 25a, 25b and 25c on its upper side and a cylindrical portion 26 formed on the central bottom. A bearing cylinder 27 made of ceramic is inserted in the cylindrical portion 26 to be fixed therein by an adhesive agent. A bottom lid 28 is fixed to the lower open end of the cylindrical portion 26 by screws 29, thereby closing the end. The bottom lid 28 has a concavity 28a which is open to the interior of the cylindrical portion 26. A sliding thrust receiving member 30 made of ceramic is provided in the concavity 28a. The sliding thrust receiving member 30 constitutes thrust bearing means.

An electric circuit board 31 such as a printed circuit board is fixed to the upper stepped portion 25a of the base 23 by screws 32. A plurality of stator coils 33 are fixed to the upper face of the circuit board 31. A rotor assembly 35 including a rotational shaft 34 is rotatably mounted in the motor casing 22. The shaft 34 is made of a hardened stainless steel, for example, and rotatably inserted in the bearing cylinder 27. The shaft 34 has two pairs of vertically disposed herringbone grooves 36 and 37 formed in an outer circumferential face thereof. A bearing gap 38 of about several μm is defined between the inner circumferential face of the bearing cylinder 27 and the outer circumferential face of the rotational shaft 34. The bearing cylinder 27 and the rotational shaft 34 constitute dynamic pressure air bearing means 39 in which air serves as a lubricating fluid. The rotational shaft 34 has on the lower end a convexity 34a at which the shaft 34 is held on the sliding thrust receiving member 30, so that a thrust load of the rotor assembly 35 is received via the shaft 34 by the sliding thrust receiving member 30.

An annular flange 40 is mounted to the upper circumferential face of the rotational shaft 34. A rotor yoke 41 is fixed to the underside of the flange 41 by the adhesive agent. An annular rotor magnet 42 is fixed to the underside of the rotor yoke 41 by the adhesive agent. The rotor magnet 42 is disposed relative to the stator coils 33 so that a predetermined axial gap 43 is defined therebetween. A polygon mirror 44 for scanning laser beams in the laser beam printer is attached to the upper portion of the flange 40 by a mirror presser 45 and screws 46 so that the mirror is rotated together with the rotor assembly 35. A mounting member 47 is mounted to the backside of the flange 40 so as to be rotated with the rotational shaft 34. The mounting member 47 extends through a hole (not shown) of the circuit board 31 so as to cover the bearing cylinder 27 from above the same. A rotating yoke 48 is fixed to a lower portion of the mounting member 47 so as to be positioned under the circuit board 31 in parallel therewith. The rotating yoke 48 serves as a magnetically focusing yoke. The rotating yoke 48 is disposed to be opposite to the rotor magnet 42 with the circuit board 31 and the stator coils 33 being interposed therebetween so that magnetic fluxes generated by the rotor magnet 42 pass through the rotating yoke 48.

Figure 2:
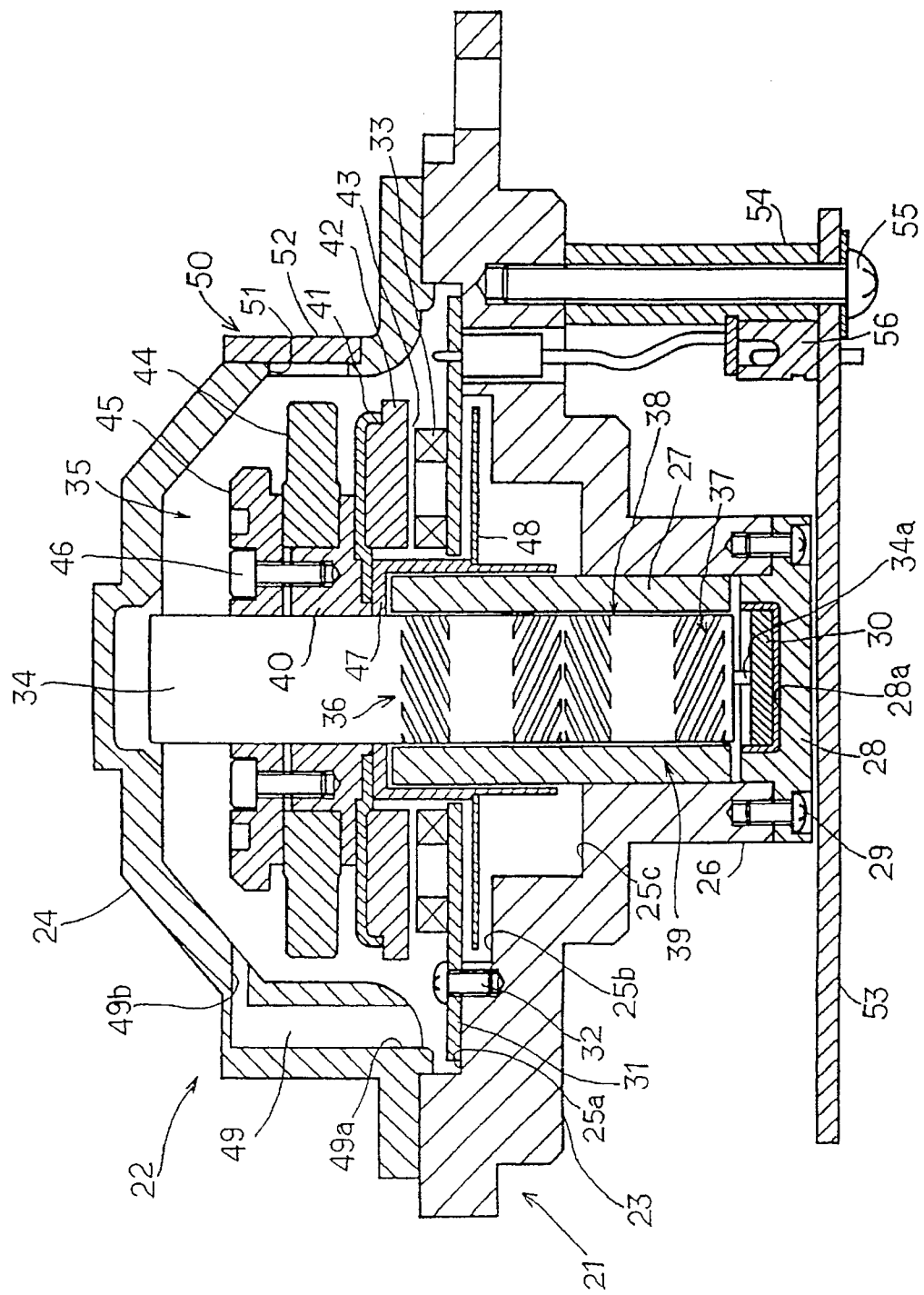
FIG. 2 is a longitudinal section of the overall motor.

The cover 24 of the motor casing 22 has a vertically or axially extending air flow path 49 serving as a gas flow path, as viewed in FIGS. 1 and 2. The air flow path 49 is formed so as to correspond to the rotor magnet 42 of the rotor assembly 35 and an outer periphery of the polygon mirror 44. The air flow path 49 has lower and upper ends 49a and 49b which are open to the interior of the motor casing 22. The lower open end 49a of the air flow path 49, which serves as an inlet, is located above the circuit board 31 while the upper open end 49b thereof, which serves as an outlet, is located above the polygon mirror 44. The cover 24 further has a window 50 which is disposed so as to correspond to the outer periphery of the polygon mirror 44. Laser beams are allowed to go into and out of the motor casing 22 through the window 50. The window 50 is constituted by a hole 51 formed through the cover 24 and a light-transmitting member 52 which covers the hole 51 to thereby close the same. An electric circuit board 53 including a drive circuit (not shown) is fixed to the backside of the base 23 by a spacer 54 and a screw 55, as shown in FIG. 2. The electric circuit on the circuit board 54 is electrically connected via an electrical connector 56 to the electric circuit on the circuit board 31 disposed in the motor casing 22.

The operation of the motor will now be described. Upon rotation of the rotor assembly 35, the action of the herringbone grooves 36 and 37 draws air into the bearing gap 38 between the bearing cylinder 27 and the rotational shaft 34, whereupon high dynamic pressure serving as dynamic air bearing is produced. The rotational shaft 34 is rotated without contact with the bearing cylinder 27 by the action of the established dynamic pressure air bearing. The thrust load of the rotor assembly 35 is received via the shaft 34 by the sliding thrust receiving member 30.

Rotation of the rotor assembly 35 causes flows of air in the motor casing 22. The lower space inside the cover 24, where the rotor magnet 42 and the polygon mirror 44 having large radii of rotation respectively, has a small capacity whereas the upper space inside the cover 24, where the upper end of the rotational shaft 34 is located, has a larger capacity. Consequently, a pumping action with rotation of the rotor assembly 35 causes air in the upper space inside the cover 24 to flow downwardly to the lower space inside the cover 24. In the embodiment, however, the air flow path 49 is formed in the cover 24. The air having flown to the lower space enters the air flow path 49 through the lower open end 49a thereof, exiting through the upper open end 49b thereof. Thus, the air is returned to the upper space. Since the air is caused to flow through the air flow path 49 in the motor casing 22 as described above, occurrence of the pressure difference in the motor casing can be restrained. Thus, even though the dynamic pressure air bearing means is provided as the bearing means for the rotor assembly 35, irregular movement thereof caused such as by the assembly being drawn upwardly can be prevented and accordingly, stable rotation of the rotor assembly 35 can be achieved. Furthermore, since the rotor assembly 35 includes the magnetically focusing rotating yoke 48 which receives the magnetic fluxes generated by the rotor magnet 42, magnetically attractive forces the rotor magnet 42 applies to the rotating yoke 48 do not increase the thrust load applied to the thrust receiving member 30.

Figure 3:
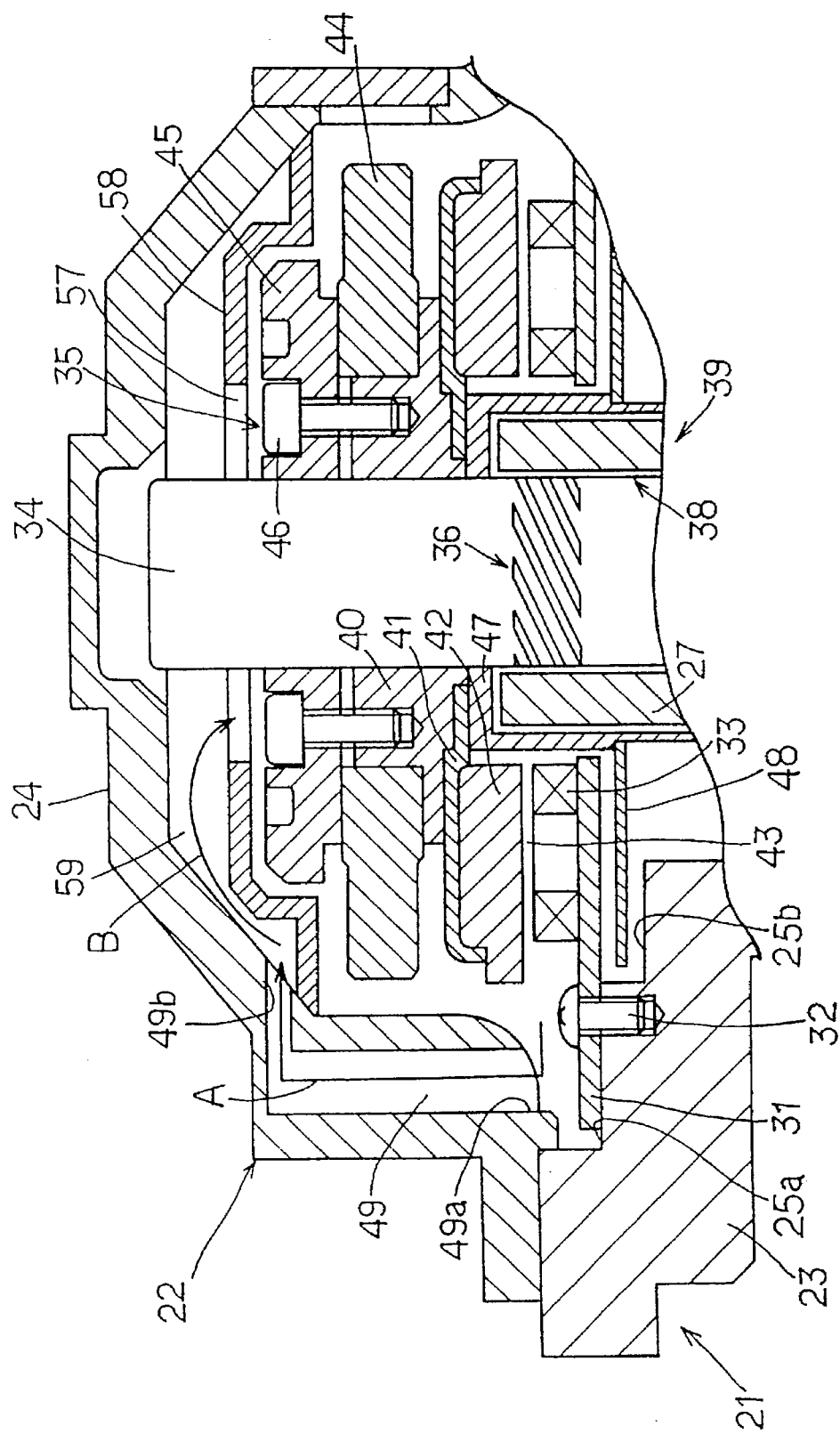
FIG. 3 is a view similar to FIG. 1, showing an enclosed electric motor of a second embodiment in accordance with the present invention.

FIG. 3 illustrates a second embodiment of the invention. The differences between the first and second embodiments will be described. An annular partition wall 58 is provided to partition the upper space inside the cover 24 into upper and lower spaces. The partition wall 58 has a central circular hole 57. An extension air flow path 59 is defined as the result of provision of the partition wall 58. The partition wall 58 has an outer periphery abutted against the inner surface of the cover 24, so that the extension air flow path 59 communicates with the upper open end 49b of the air flow path 49. The extension air flow path 59 further communicates via the hole 57 with the lower interior of the motor casing 22.

In the second embodiment, the air, exiting the upper open end 49b of the air flow path 49, is guided through the extension air flow path 59 and the hole 57 to the upper end side of the rotational shaft 34 as shown by arrow B in FIG. 3. Thus, as the result of provision of the partition wall 58 in the motor casing 22, the air flow in the upper space in the motor casing 22 is bifurcated or divided into a flow along the inner surface of the partition wall 58 and a flow through the extension air flow path 59 along the outer surface of the wall. Furthermore, a gap between the rotor assembly 35 and the partition wall 58 is limited to a proper one. Consequently, since the air flow in the motor casing 22 is rendered laminar, occurrence of a turbulent flow can be restrained and accordingly, windage loss can be reduced. With these effects, an input current of the motor can be reduced and a rise in the motor temperature can be restrained.

Figure 4:
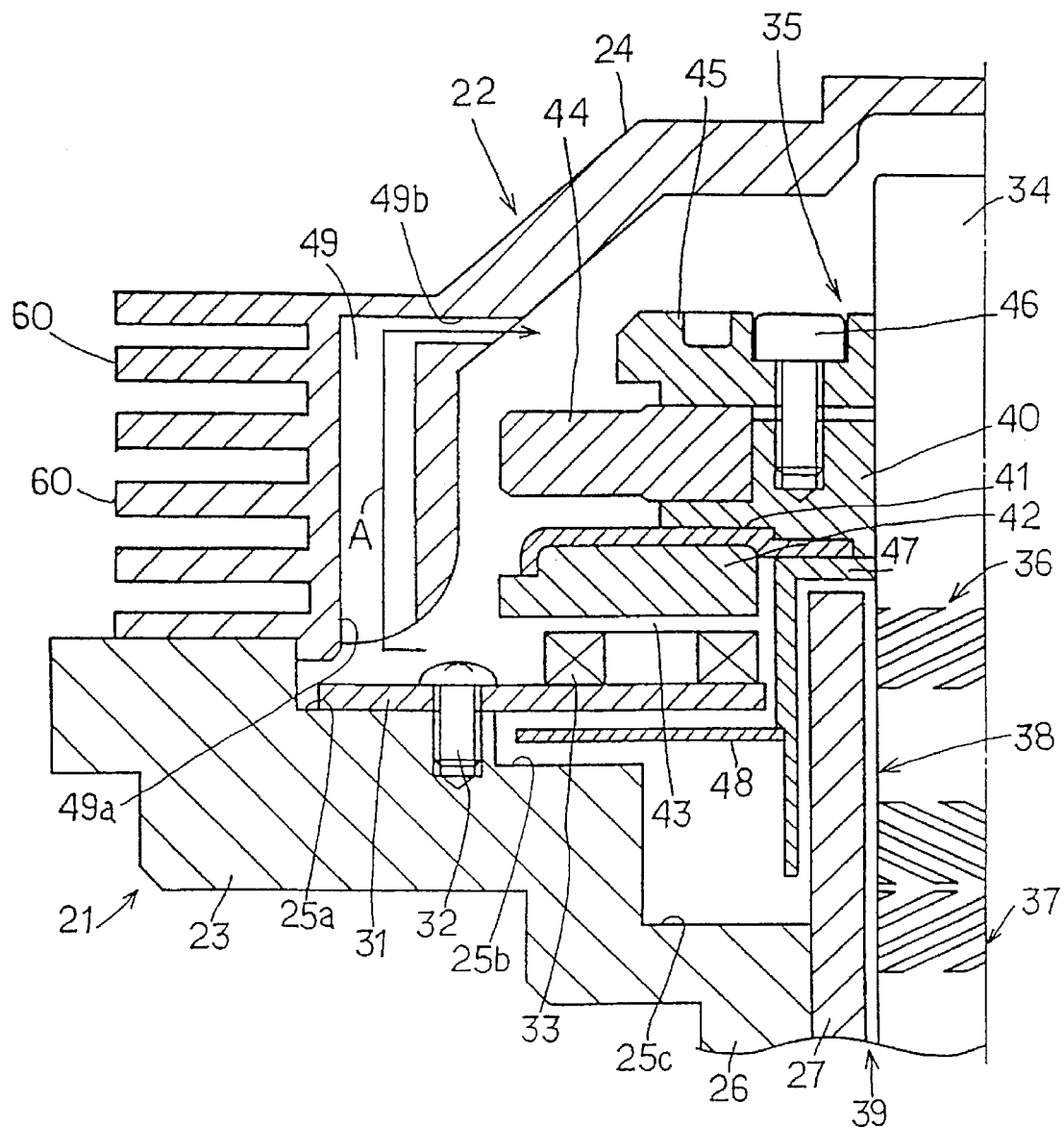
FIG. 4 is a view similar to FIG. 1, showing an enclosed electric motor of a third embodiment in accordance with the present invention.

FIG. 4 illustrates a third embodiment of the invention. The third embodiment differs from the first embodiment in the provision of a plurality of heat-dissipating fins 60. The heat-dissipating fins 60 are integrally formed on the outer surface of the cover 24 of the motor casing 22 so as to correspond to the air flow path 49.

The air in the motor casing 22, when flowing through the air flow path 49, can be positively cooled by the action of the heat-dissipating fins 60. Consequently, the temperature rise in the motor can be further restrained. Air is high-pressurized in the bearing gap 38 to thereby generate heat in the electric motor employing the dynamic pressure air bearing means 39 as the bearing means for the rotor assembly 35. The heat raises the temperature of the bearing section. In the third embodiment, however, the temperature rise in the bearing section can be restrained. This prevents variations in the bearing gap 38 caused by the difference in the thermal expansion coefficient between the shaft 34 and the bearing cylinder 27 due to the difference in the material between these parts. Consequently, a stable rotational accuracy by the dynamic pressure air bearing can be achieved.

Figure 5:
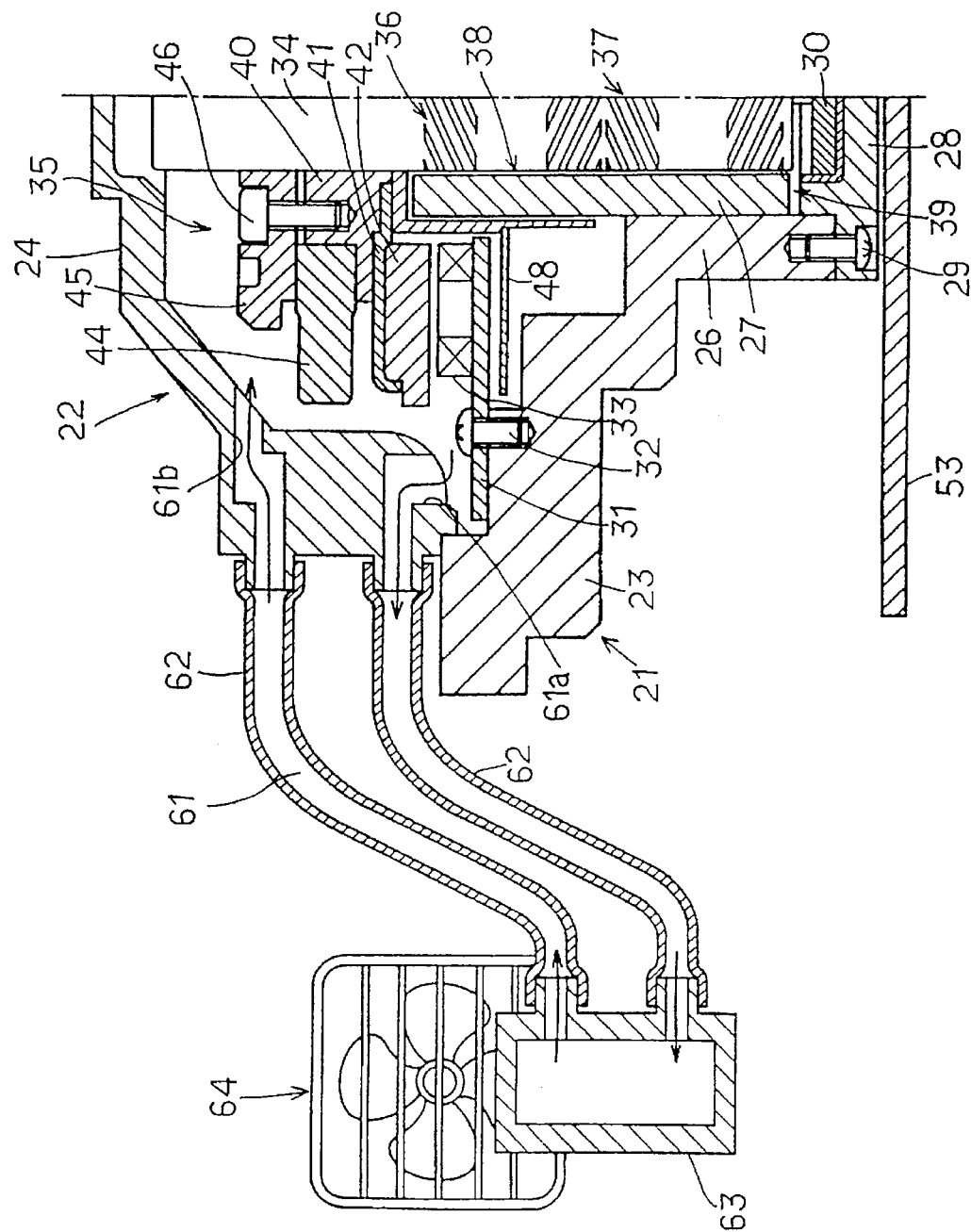
FIG. 5 is a view similar to FIG. 1, showing an enclosed electric motor of a fourth embodiment in accordance with the present invention.

FIG. 5 illustrates a fourth embodiment of the invention. Two tubes 62 constitute a part of the air flow path 61. One ends of these tubes 62 are connected to a cooling tank 63, which is disposed so as to be subjected to flows of air produced by a blower 64 provided for cooling the motor and serving as a cooling device. The other ends of the tubes 62 are connected to the lower inlet open end 61a and the upper outlet open end 61b respectively. In the fourth embodiment, the air in the motor casing 22 can be cooled more positively and accordingly, the rise of the motor temperature can be further restrained.

Figure 6:
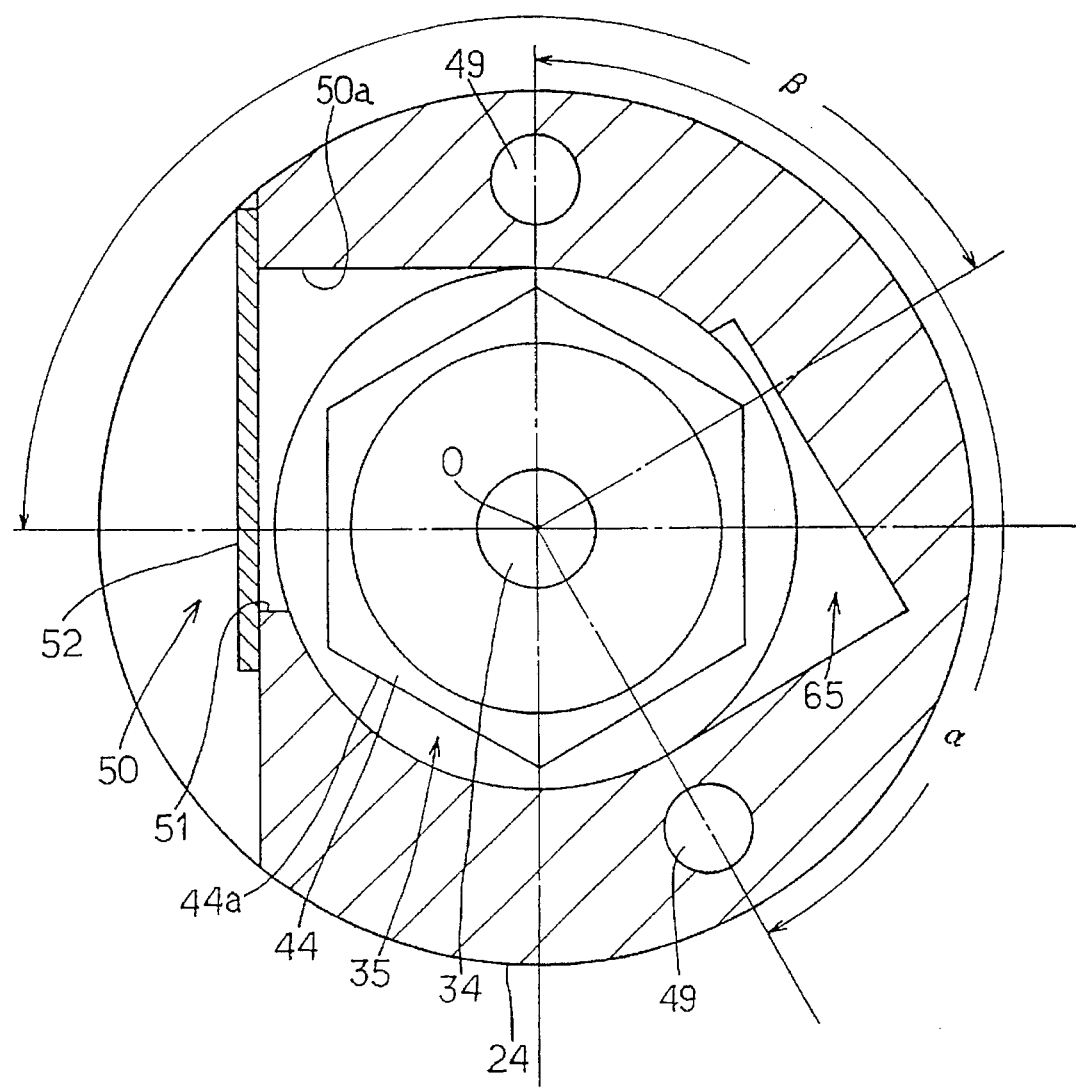
FIG. 6 is a transverse section of an enclosed electric motor of a fifth embodiment in accordance with the present invention.
Figure 7:
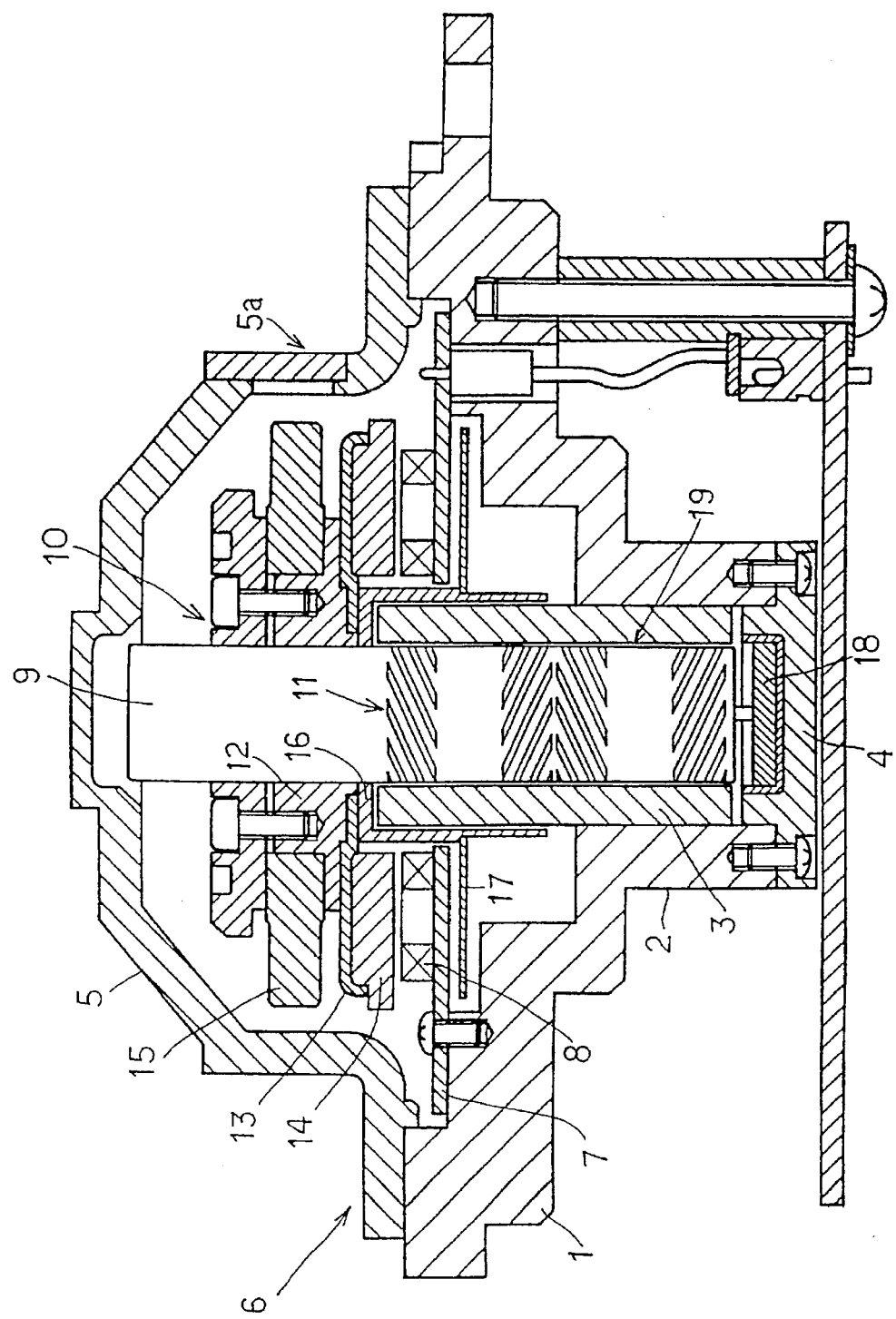
FIG. 7 is a view similar to FIG. 2, showing a prior art arrangement.

FIG. 6 illustrates a fifth embodiment of the invention. The cover 24 is provided with even-numbered air flow paths 49 (two in the embodiment). Both air flow paths 49 are disposed on one and the same circumference of a circle described about the center O of rotation of the rotor assembly 35. An angle $\alpha$ of circumference between the air flow paths 49 is set to be obtained by the following expression:

$$\alpha = (360° \div N) \times I + (360° \div N) \times \tfrac{1}{2} \quad (1)$$

where N is the number of mirror surfaces of the polygon mirror and I is an integer. In the embodiment, since the number of the mirror surfaces 44a of the polygon mirror 44 is 6 and the integer is 2, the angle $\alpha$ is set at 150 degrees. With the above-described setting of the angle $\alpha$, the inlet open ends 49a of the air flow paths 49 (see FIGS. 1 and 2) are disposed on one and the same circumference of the circle described about the center O of rotation of the rotor assembly 35, and the angle $\alpha$ of circumference between the ends 49a is set at 150 degrees, although such disposition is not shown. In the same manner, the outlet open ends 49b of the air flow paths 49 (see FIGS. 1 and 2) are disposed on one and the same circumference of the circle described about the center O of rotation of the rotor assembly 35, and the angle $\alpha$ of circumference between the ends 49b is also set at 150 degrees, although such disposition is not shown.

The cover 24 is provided with a window-shaped portion or an auxiliary concavity 65 formed into substantially the same configuration as a window concavity 50a constituting the inside of the window 50 through which the laser beams go into and out of the motor casing 22. The window concavity 50a and the auxiliary concavity 65 are disposed on one and the same circumference of a circle described about the center O of rotation of the rotor assembly 35. An angle $\beta$ of circumference between these concavities is set to be obtained by the following expression:

$$\beta = (360° \div N) \times I + (360° \div N) \times \tfrac{1}{2} \quad (2)$$

where N is the number of mirror surfaces of the polygon mirror and I is an integer. In the embodiment, since the number of the mirror surfaces 44a of the polygon mirror 44 is 6 and the integer is 2, the angle $\beta$ is set at 150 degrees which is the same as the angle $\alpha$.

A sound such as a moan of the wind due to rotation of the polygon mirror 44 is produced in the vicinity of the open ends 49a and 49b of the air flow path 49 during rotation of the rotor assembly 35. The sound has a frequency f (Hz) shown by the following expression:

$$f = R \times N \quad (3)$$

where R is the number of revolution of the polygon mirror in rps and N is the number of mirror surfaces of the polygon mirror. Two air flow paths 49 are provided in the cover 24 so that the angles $\alpha$ and $\beta$ between the open ends 49a thereof and the open ends 49b thereof respectively are each set at 150 degrees. Consequently, the sound is produced at the open end of one of the air flow paths 49 one half cycle out of phase with that produced at the open end of the other air flow path 49 under the condition of the same frequency. Since the sounds interfere with each other, a noise reduction can be achieved.

Furthermore, a sound such as a moan of the wind due to rotation of the polygon mirror 44 is also produced in the vicinity of the window concavity 50a during rotation of the rotor assembly 35. The frequency of the sound in this case is also shown by the above expression (3). The auxiliary concavity 65 having substantially the same configuration as the window concavity 50a is provided in the cover 24 in the embodiment. The angle $\beta$ between the window concavity 50a and the auxiliary concavity 65 is set at 150 degrees. Consequently, the sound is produced at either one of the concavities one half cycle out of phase with that produced at the other concavity under the condition of the same frequency. Since the sounds interfere with each other, a noise reduction can be achieved.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. An enclosed electric motor comprising:

an enclosed motor casing having a window through which laser beams are allowed to go into and out of the motor casing, and a window-shaped portion having substantially the same shape as the window;

a rotor assembly including a rotational shaft with an end and a rotor magnet, the rotor assembly being rotatably held via dynamic pressure gas bearing means in the motor casing;

a gas flow path defined in a portion of a wall of the motor casing opposed to an outer periphery of the rotor assembly so as to extend along the outer periphery of the rotor assembly axially of the rotational shaft, the gas flow path having two ends respectively serving as an inlet and an outlet axially spaced apart from each other and open to the interior of the motor casing so that a gas in the motor casing is caused to flow through the gas flow path upon rotation of the rotor assembly; and a polygon mirror mounted on the end of the rotational shaft so as to be rotated therewith for reflecting the laser beams having passed through the window of the motor casing;

wherein both of the window and the window-shaped portion are formed so as to correspond to an outer periphery of the polygon mirror; and wherein the window and the window-shaped portion are located on one and the same circumference of a circle described about the center of rotation of the rotor assembly, and an angle of circumference between the window and the window-shaped portion is set at a value obtained by the following expression:

$$(360°\div N)\times I+(360°\div N)\times \tfrac{1}{2}$$

where N is the number of mirror surfaces of the polygon mirror and I is an integer.

2. A motor according to claim 1, further comprising an annular partition wall provided at the outlet end side of the gas flow path so as to be disposed between the inner face of the motor casing and the rotor assembly, the partition wall guiding the gas exiting the outlet end of the gas flow path toward the side of the end of the rotational shaft.

3. A motor according to claim 1, wherein the motor casing has heat-dissipating fins which are provided on the outer periphery of the motor casing so as to be opposite to the gas flow path.

4. A motor according to claim 1, further comprising a cooling tank connected to the gas flow path and wherein the cooling tank is cooled by a cooling device.

5. A motor according to claim 1, wherein even-numbered gas flow paths are provided in the motor casing and the gas flow paths have respective ends located on one and the same circumference of a circle described about the center of rotation of the rotor assembly.

6. An enclosed electric motor comprising:

an enclosed motor casing having a window through which laser beams are allowed to go into and out of the motor casing;

a rotor assembly including a rotational shaft with an end and a rotor magnet, the rotor assembly being rotatably held via dynamic pressure gas bearing means in the motor casing;

a pair of gas flow paths each defined in a portion of a wall of the motor casing opposed to an outer periphery of the rotor assembly so as to extend along the outer periphery of the rotor assembly axially of the rotational shaft, each gas flow path having two ends respectively serving as an inlet and an outlet axially spaced apart from each other and open to the interior of the motor casing so that a gas in the motor casing is caused to flow through the gas flow paths upon rotation of the rotor assembly; and a polygon mirror mounted on the end of the rotational shaft so as to be rotated therewith for reflecting the laser beams having passed through the window of the motor casing;

wherein an angle of circumference between the ends of the respective paired gas flow paths is set at a value obtained by the following expression:

$$(360°\div N)\times I+(360°\div N)\times \tfrac{1}{2}$$

where N is the number of mirror surfaces of the polygon mirror and I is an integer.

* * * * *